March 22, 1932.  C. N. PETERSON  1,850,215
TRAY FOR BROODERS
Filed June 1, 1929  2 Sheets-Sheet 1
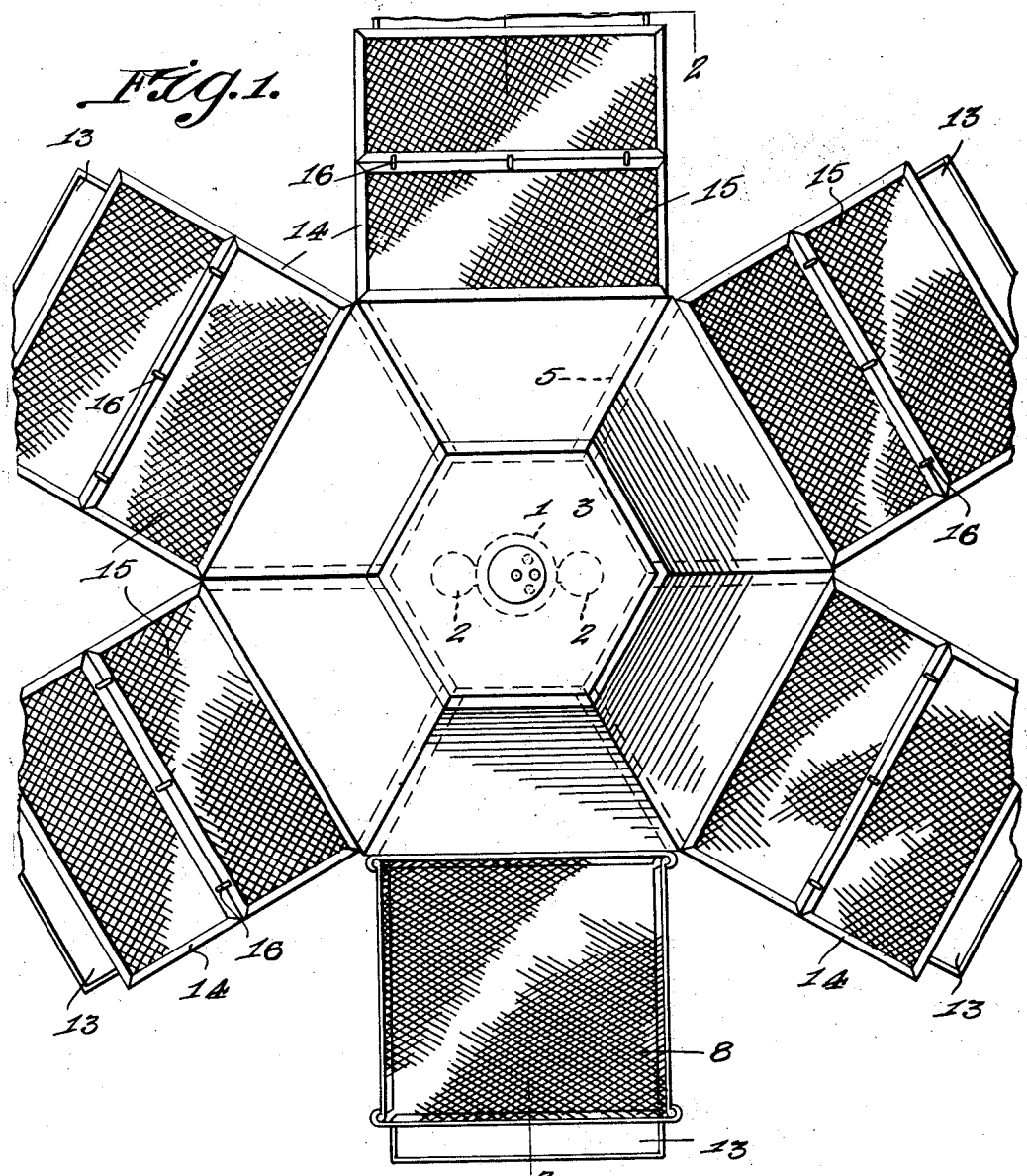
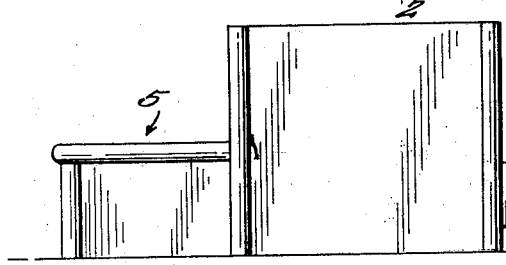
C. N. Peterson,
INVENTOR
BY Victor J. Evans
ATTORNEY

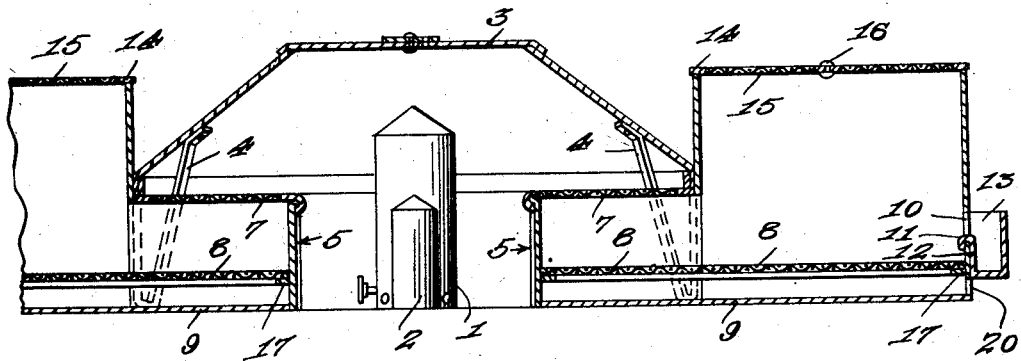
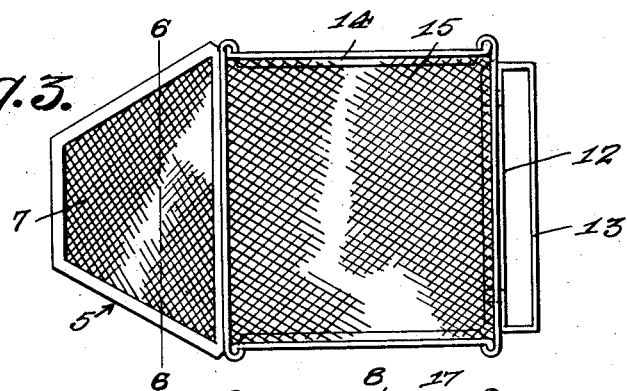
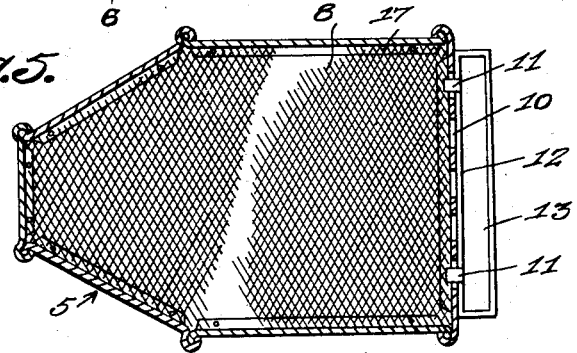
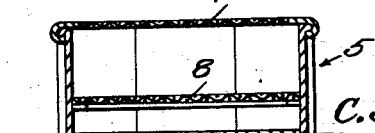

Patented Mar. 22, 1932

1,850,215

UNITED STATES PATENT OFFICE

CLARENCE N. PETERSON, OF POLK, NEBRASKA

TRAY FOR BROODERS

Application filed June 1, 1929. Serial No. 367,652.

My present invention has reference to an attachment for brooders and particularly to that type of brooders which has its sides open and provided with a number of angle surfaces, the object being the provision of an attachment in the nature of a compartment whose inner portion is reduced in height so that the same may be readily inserted through the open sides of the brooder and whereby chicks of different ages, sizes and breeds may be segregated and further wherein weak or sickly chicks may be arranged in one of the housings comprising the chambers so that the germs of the disease with which they are infected will not infect the chicks in the remaining compartments or housings.

A further object is the provision of a brooder attachment in the nature of a housing wherein the chicks may be readily moved beneath the hover to obtain the warm air from the stove thereof should the said chicks become cold or may move into the outer portion of the housing or compartment to receive food and fresh air and sunlight, and further wherein the floor in each of the compartments is in the nature of a reticulated member having a pan in the nature of a cardboard sheet therebelow to receive the droppings of the chicks so that the chicks cannot eat the same and become sick therefrom and further wherein the outer facings of each of the housings or compartments have removably attached thereto both a food and drink retaining tray, the said outer face being provided with openings whereby the chicks may obtain access to the said trays and the lower walls of the said openings also providing means for supporting the trays thereon.

A still further object is the provision of a brooder attachment for this purpose in which the reticulated top on the outer portion of each of the box-like compartments or housings comprises a hinged member, whereby the chicks may be placed in or removed from the compartment as occasion requires.

To the attainment of the foregoing and other objects which will present themselves as the nature of the invention is better understood, the improvement further resides in certain other novel features of construction, combination and operative association of parts, one satisfactory embodiment of which is disclosed by the accompanying drawings.

In the drawings:

Figure 1 is a top plan view of a hexagonal-shaped brooder provided with my improvement, the lower box-like compartment having its cover removed.

Figure 2 is a sectional view approximately on the line 2—2 of Figure 1.

Figure 3 is a top plan view of one of the box-like compartments.

Figure 4 is a side elevation thereof.

Figure 5 is a horizontal sectional view therethrough.

Figure 6 is a sectional view approximately on the line 6—6 of Figure 3.

While my improved chick segregating compartments may be arranged upon any type of brooder that is provided with open sides, I have in the accompanying drawings shown the same in applied position to a particular type of brooder which is hexagonal in plan and which has a dome-shaped top provided with the usual pivoted apertured disc ventilator to receive the gas that may escape from the cylindrical protective casing 1 for the lamp or burner 2 in the said brooder 3. The brooder is supported at its corners with the usual substantially V-shaped legs 4, whereby the dome or top of the brooder is sustained at a suitable elevation above the floor of the hennery or above a ground surface.

In carrying out my invention I make use of a plurality of box-like housings which preferably correspond in number with the open sides of the brooder 3. In order to rigidly and securely, as well as easily connect the sides and ends of each of the housings or compartments, the same are made of plates, certain of which have their edges beaded and the others their edges rounded to receive the beads therein. This construction is clearly disclosed by Figures 3, 5 and 6 of the drawings.

The outer portions of the compartments, those arranged exteriorly of the brooder 3 are of a greater length and a greater height than the inner portions which are indicated by the numeral 5. These inner portions have their side walls disposed at an inward angle with respect to their front walls so that the angular sides of the portions 5 received in the brooder, as disclosed by the dotted lines in Figure 1 of the drawings may contact one with another. The top of the portion 5 of each of the compartments is reticulated, as indicated by the numeral 7 and the bottom or floor of each of the compartments is also reticulated, as indicated by the numeral 8. The floor 8 is arranged a considerable distance above the bottom of the said compartment and on the bottom of said compartment I arrange a pan 9 which is of a thick sheet of cardboard or the like and which pan receives therein the droppings from the chicks in the compartments.

The outer face of each of the compartments at a slight but suitable distance above the floor 8, is provided with a plurality of spaced alining openings 10 and the lower wall of each of these openings is engaged by the hooked end 11 formed on the reduced inner face 12 of a food and water supporting tray 13.

The top of the outer or elevated portion of each of the housings is covered by a closure 14. Each of the closures comprises frames which are covered by reticulated material 15 and the confronting ends of the cover sections have passed therethrough ring members 16 which provide hinges. By this arrangement it will be apparent that either of the sections of the cover 15 may be raised to insert chicks into the compartment or remove chicks therefrom.

My improvement is of an extremely simple nature. The advantages thereof will, it is thought, be understood by those skilled in the art to which such invention relates. With my device it will be noted that chicks of different sizes and characters may be segregated, that is, certain classes of chicks may be arranged in each of the several compartments. In this manner weak or sickly chicks may be arranged in compartments other than those in which healthy chicks are received. Also in this manner a spread of disease contracted by the chicks in any compartments will not render the chicks in other compartments liable to the same disease or disorder. The floors 8 are supported upon inwardly directed flanges 17 and may, therefore, be readily removed. By providing the recticulated floors the droppings of the chicks drop into the pans 9 so as previously stated the chicks cannot be affected by diseases therefrom. The front of each compartment is provided with an opening 20 whereby the sheets which I have termed the pans may be readily removed and easily replaced.

While I have herein set forth a preferred embodiment of my device I do not wish to be restricted to the precise details herein set forth and, therefore, hold myself entitled to make such changes therefrom as fairly fall within the scope of what I claim.

Having described the invention, I claim:

1. An attachment for brooders comprising a member divided into two communicating compartments, one of the compartments being of a greater height than the other compartment whereby the lower compartment may be received in a brooder with the higher compartment disposed exteriorly of the brooder, a reticulated top for the lower compartment to place the latter in communication with the interior of the brooder, and a two-part centrally hinged reticulated top for the higher compartment.

2. An attachment for brooders comprising a member divided into two communicating compartments, one of said compartments being of a greater height than the other compartment whereby the lower compartment may be received in a brooder, a reticulated top for the lower compartment to place the interior of the latter in communication with the interior of the brooder, a reticulated cover for the higher compartment, horizontal flanges located in the compartments below their lower edges, and a reticulated plate mounted on the flanges and providing a floor to said compartments.

3. An attachment for brooders comprising a member divided into two communicating compartments, one of said compartments being of a greater height than the other compartment whereby the lower compartment may be received in a brooder, flanges in said compartments and spaced above the lower edges thereof, a reticulated plate mounted on said flanges, the higher compartment above said plate having an opening, a feed pan supported by one wall of the opening, said higher compartment having an opening below the plate, and a removable tray positioned within the compartments by way of the last named opening under said plate.

4. An attachment for brooders including a chamber having an opening in the sides thereof and a heating medium located centrally of said chamber, a plurality of receptacles each including a pair of communicating compartments and one compartment of each pair being of less height than the companion compartment and said reduced compartments extending through the openings with the inner ends thereof spaced from the heating medium, said reduced compartments having converging side walls and the converging side walls of each compartment arranged in abutting engagement with the converging side walls of the adjacent compartments when positioned in the chamber, and means on the reduced compartments to permit heat to enter the interior thereof from the interior of the chamber.

In testimony whereof I affix my signature.

CLARENCE N. PETERSON.